United States Patent
Vetter et al.

(10) Patent No.: US 10,275,300 B2
(45) Date of Patent: Apr. 30, 2019

(54) SYSTEMS AND METHODS FOR PRIORITIZING A SUPPORT BUNDLE

(71) Applicant: Oracle International Corporation, Redwood City, CA (US)

(72) Inventors: Mark Vetter, Holden, MA (US); Rameshkumar Ramasamy, Reading (GB)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 397 days.

(21) Appl. No.: 14/924,211

(22) Filed: Oct. 27, 2015

(65) Prior Publication Data
US 2017/0116098 A1    Apr. 27, 2017

(51) Int. Cl.
*G06F 11/00* (2006.01)
*G06F 11/07* (2006.01)
*G06F 11/20* (2006.01)

(52) U.S. Cl.
CPC ...... *G06F 11/0775* (2013.01); *G06F 11/0781* (2013.01); *G06F 11/2069* (2013.01); *G06F 2201/805* (2013.01)

(58) Field of Classification Search
CPC ............. G06F 11/0766; G06F 11/0775; G06F 11/0778; G06F 11/0781; G06F 11/2069
See application file for complete search history.

(56) References Cited

U.S. PATENT DOCUMENTS

| | | | |
|---|---|---|---|
| 7,047,309 B2* | 5/2006 | Baumann ................ | H04L 47/10 370/395.41 |
| 7,542,985 B1 | 6/2009 | Compton et al. | |
| 9,766,969 B2* | 9/2017 | Prabhakara ........... | G06F 11/079 |
| 10,114,731 B2* | 10/2018 | Fan ........................ | G06F 11/366 |
| 2005/0050401 A1* | 3/2005 | Matsuki .............. | G06F 11/0778 714/42 |
| 2009/0210747 A1 | 8/2009 | Boone et al. | |
| 2010/0058117 A1 | 3/2010 | Compton et al. | |

(Continued)

FOREIGN PATENT DOCUMENTS

WO    2017074753    5/2017

OTHER PUBLICATIONS

International Application No. PCT/US2016/057586, International Search Report and Written Opinion dated Jan. 17, 2017, 10 pages.

(Continued)

*Primary Examiner* — Michael Maskulinski
(74) *Attorney, Agent, or Firm* — Kilpatrick Townsend & Stockton LLP (57) ABSTRACT

Implementations described and claimed herein provide systems and methods for prioritizing a support bundle. In one implementation, a fault indication specifying at least one fault of a storage device is generated. A request for support data for diagnosing a cause of the fault is received at the storage device. Low priority data for diagnosing the fault is identified from the support data. A prioritized support bundle is generated having a low priority bundle subset containing the low priority data and a high priority bundle subset containing remaining data in the support data for the storage device. The high priority bundle subset is sent to a diagnostic device over a network separately from the low priority bundle subset.

16 Claims, 4 Drawing Sheets

(56) References Cited

U.S. PATENT DOCUMENTS

| | | | | |
|---|---|---|---|---|
| 2011/0317587 A1* | 12/2011 | Lida | ................... | H04L 12/2832 |
| | | | | 370/254 |
| 2013/0212432 A1* | 8/2013 | Guthrie | ............... | G06F 11/0709 |
| | | | | 714/16 |
| 2015/0149822 A1* | 5/2015 | Coronado | ........... | G06F 11/0727 |
| | | | | 714/15 |
| 2016/0028845 A1* | 1/2016 | Barr | ................... | G06F 11/0751 |
| | | | | 714/37 |
| 2016/0371132 A1* | 12/2016 | Prabhakara | ........... | G06F 11/079 |
| 2017/0262327 A1* | 9/2017 | Barr | ................... | G06F 11/0751 |

OTHER PUBLICATIONS

PCT/US2016/057586 received an International Preliminary Report on Patentability dated Sep. 29, 2017, 6 pages.

* cited by examiner

SYSTEMS AND METHODS FOR PRIORITIZING A SUPPORT BUNDLE

TECHNICAL FIELD

Aspects of the present disclosure relate to network file systems utilizing storage appliances. More particularly, aspects of the present disclosure involve systems and methods for delivering diagnostic data from a storage device over a network.

BACKGROUND

The continuous expansion of the Internet, the expansion and sophistication of enterprise computing networks and systems, the proliferation of content, like movies, stored and accessible over the Internet, and numerous other factors continues to drive the need for large sophisticated data storage systems. Consequently, as the demand for data storage continues to increase, larger and more sophisticated storage systems are being designed and deployed. Many large scale data storage systems utilize storage appliances that include arrays of storage media. These storage appliances are capable of storing incredible amounts of data. For example, at this time, some storage appliances can store over 2 petabytes of data (over 2 quadrillion bytes of data). Moreover, multiple storage appliances may be networked together to form a cluster, which allows for an increase in the volume of stored data. Additionally, storage appliances arranged in a cluster may be configured to mirror data so that if one of the storage appliances becomes inoperable, the data is available at another storage location.

As the number of components, the number of users, and the volume of data increases, so does the size and complexity of the storage system. Occasionally, a client utilizing a storage system having storage appliances encounters a performance issue. To diagnose the root cause of the performance issue and determine a remedy, diagnostic data may be extracted from the storage appliance and provided to a service engineer for analysis. Conventionally, the diagnostic data comprises one large file including monolithic, comprehensive snapshots of a state of the storage appliance.

Due to the size of the file, the length of time between when the issue is reported and the diagnostic data is received by the service engineer is often drastic. For example, many conventional systems transmit the diagnostic data from the storage device to the service engineer over a network. Transmitting such an incredible amount of data over a network takes considerable time. For example, in many cases, it takes days to send the diagnostic data over a network to a service engineer. The client is thus waiting a consider able amount of time before the service engineer is able to start analyzing the data for diagnosis and resolution. Alternatively, to expedite this process, some clients will save the diagnostic data to a portable storage device for hand delivery to the service engineer, which is inefficient and inconvenient for the client.

It is with these observations in mind, among others, that various aspects of the present disclosure were conceived and developed.

SUMMARY

Implementations described and claimed herein address the foregoing problems by providing systems and methods for prioritizing a support bundle. In one implementation, a fault indication specifying at least one fault of a storage device is generated. A request for support data for diagnosing a cause of the fault is received at the storage device. Low priority data for diagnosing the fault is identified from the support data. A prioritized support bundle is generated having a low priority bundle subset containing the low priority data and a high priority bundle subset containing remaining data in the support data for the storage device. The high priority bundle subset is sent to a diagnostic device over a network separately from the low priority bundle subset.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

DETAILED DESCRIPTION

Aspects of the present disclosure involve systems and methods for for prioritizing a support bundle for diagnosis and resolution of one or more faults of a storage device. Generally, diagnostic data pertaining to a fault of a storage device is delivered to a diagnostic device in multiple phases to facilitate quick diagnosis of a cause of the fault, resulting in faster resolution and improved client satisfaction. In one aspect, a prioritized support bundle containing the diagnostic data is generated in response to a fault indication for the storage device. The prioritized support bundle includes one or more bundle subsets, each containing a portion of the diagnostic data stored on the storage device. The bundle subsets are sent to the diagnostic device separately, with the bundle subset containing data most valuable to early diagnosis of the cause of the fault first, followed by bundle subsets with lower priority data. The storage device automatically prioritizes the diagnostic data into the one or more bundle subsets. In one aspect, low priority data for diagnosis of the cause of the fault is identified and included in a low priority bundle subset. The remaining diagnostic data is included in a high priority bundle subset, which is sent first to the diagnostic device for diagnosis and resolution of the fault of the storage device.

The various systems and methods disclosed herein generally provide for generating and sending a prioritized support bundle for fault diagnosis and resolution. The example implementations discussed herein reference storage devices, such as storage appliances. However, it will be appreciated by those skilled in the art that the presently disclosed technology is applicable in a variety of network or computing environments for one or more components of such environments. For a detailed discussion of generating a prioritized support bundle for transmission over a network for diagnosis and resolution of one or more faults of a storage device, reference is now made to FIG. 1.

Figure 1:
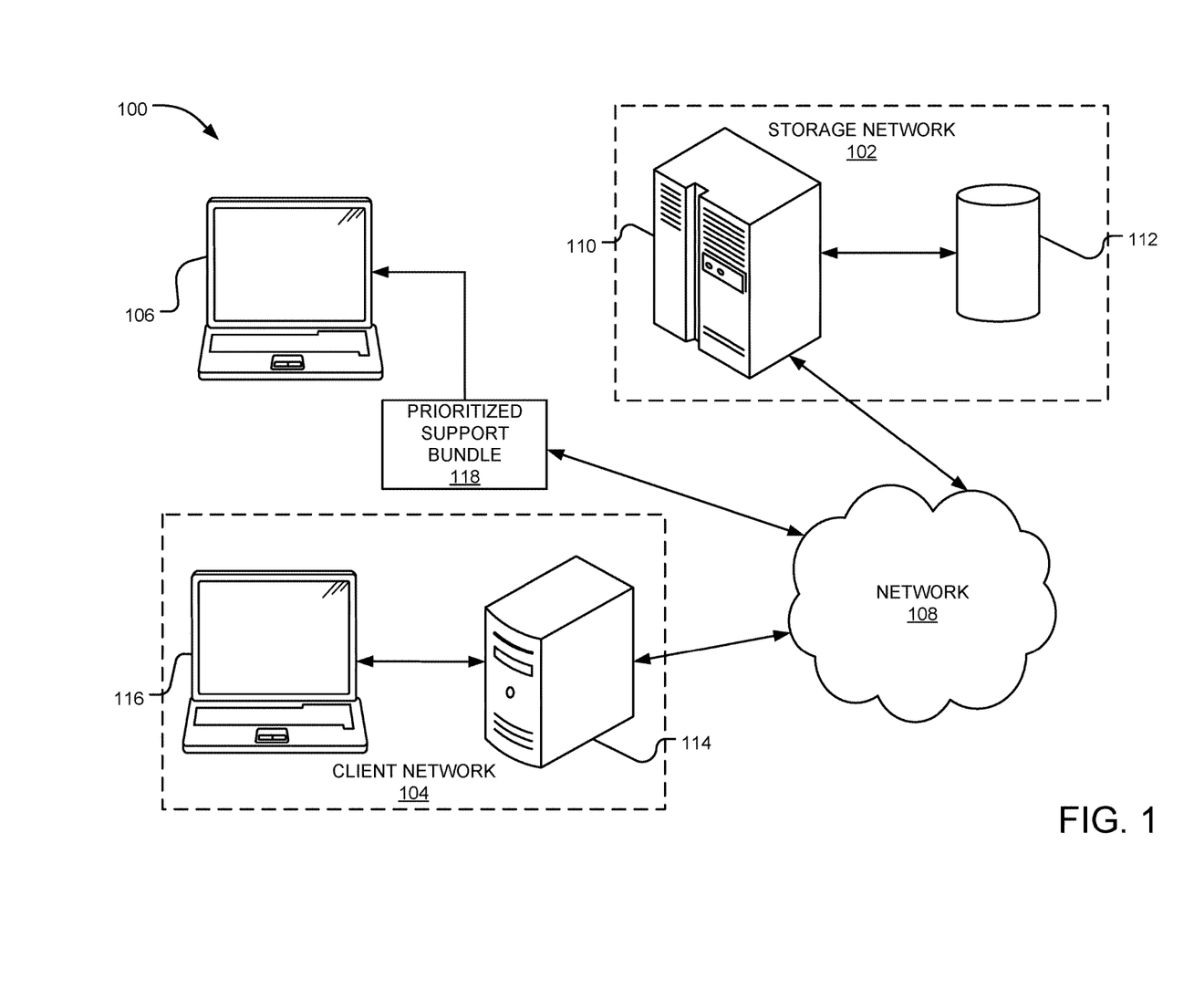
FIG. 1 is an example storage system configured to prioritize a support bundle for transmission over a network for diagnosis and resolution.

As can be understood from FIG. 1, an example storage system 100 includes a storage network 102, a client network 104, and a diagnostic device 106. The storage network 102 is accessible by the client network 104 using the network 108. It will be appreciated, however, that the various networks may comprise an integrated network, and the connections between the networks represent but one possible network topology. The depicted networks 102, 104, and 108 may also be local in nature or geographically dispersed, such as with large private enterprise networks or the Internet.

The diagnostic device 106 provides various fault diagnostic and resolution and support services, among other functions, for the storage system 100. The diagnostic device 106 may be included in the storage network 102, the client network 104, and/or in another network connected via the network 108. Moreover, the diagnostic device 106 may be connected directly to the various networks or the devices within the network. As such, it is possible that many unique terminals or computing elements may be present within the storage system 100, and through which diagnostic functions may be performed.

In one implementation, the client network 104 includes one or more servers 114 connecting one or more client devices 116 to the network 108. The server 114 may be a single server, a plurality of servers with each such server being a physical server or a virtual machine, or a collection of both physical servers and virtual machines. A virtual machine is a software implementation of a machine or component (e.g., a computing device) that executes programs like a physical machine. For example, a virtual machine may emulate an operating system.

The client device 116 and the diagnostic device 106 may be generally any form of computing device capable of interacting with the network 108, such as a terminal, a workstation, a personal computer, a portable computer, a mobile device, a smartphone, a tablet, a multimedia console, and the like. In some implementations, the client network 104, the storage network 102, and/or the diagnostic device 106 includes one or more user interfaces, such as: a browser user interface (BUI), permitting a client to interact with the storage network 102 to access data; a Command Line Interface (CLI), which is a console application for monitoring and managing the storage network 102; a Representational State Transfer (REST) application programming interface (API) for exchanging representations of resources using a standardized interface and protocol; and the like.

In one implementation, the storage network 102 includes one or more storage appliances 110, each including storage media 112. Generally, the storage appliance 110 manages the storage of data on the storage media 112, which may involve spinning media (e.g., disc drives) as well as various forms of solid state memory. In one implementation, the storage appliance 110 is a ZFS storage appliance, which involves a combined file system and volume manager designed by Sun Microsystems® in 2005 that allows for data integrity verification and repair, high storage capacities, along with numerous other features and advantages. Although discussed herein in the context of a ZFS storage appliance as an example, the storage appliance 110 may be any storage appliance.

ZFS based systems utilize a storage pool layer having one or more storage pools comprising virtual devices constructed of block devices, such as the storage media 112. A block device is any device that moves data in the form of blocks, which may be, without limitation, hard disk drives, solid state drives, optical drives, magnetic drives, and other addressable regions of memory. A virtual device may span a number of block devices or volumes, and a storage pool may include one or more virtual devices, each including one or more partitions of storage media or one or more storage media. The storage appliance 110 includes an interface layer permitting the client device 116 to interact with the storage appliance 110 as a file system. A kernel manages file system requests and translates them into data processing instructions for controlling the resources on the storage appliance 110.

Traffic to and from the storage appliance 110 is typically managed by one or more dedicated storage servers located within the storage appliance 110 or the storage network 102. A common protocol employed by the storage appliance 110 for accessing content, including files, directories, and their associated metadata is a Network File System (NFS). NFS is a widely used distributed file system protocol, originally developed by Sun Microsystems® in 1984, which allows the client network 104 to access stored data seamlessly by providing a programming interface permitting the client device 116 to: create and delete files; read and write files; perform seeks within a file; create and delete directories; manage directory contents; and perform other file, directory, or content operations. The operating system utilized by the client device 116 is configured to communicate with the NFS programming interface to manage the file system and the interaction between executing applications with data residing in the storage appliance 110. Generally, NFS systems manage file system metadata and provide access to files and directories. The file system metadata describes the location of the files and directories on the storage media 112. The storage appliance 110 maintains a log of current operations being performed by the client network 104, which is maintained in log files.

As the size and complexity of the storage system 100 increases, faults and/or performance issues may be experienced, which occur in any environment having the sophistication of the storage system 100. Conventional diagnostic approaches for addressing faults of the storage appliance 110 are often labor-intensive and time consuming, as diagnostic analysis of support data needed by service engineers cannot begin until the support data is collected on the storage appliance 110 and sent to the diagnostic device 106. Client satisfaction decreases when diagnostic analysis is delayed while support data is being collected and transmitted.

Accordingly, the storage appliance 110 prioritizes an importance of support data, including system state of the storage appliance 110, and generates a prioritized support bundle 118 including one or more bundle subsets each containing a portion of the support data. The storage appliance 110 sends the the bundle subsets to the diagnostic device 106 according to a priority of the support data contained within the bundle subsets. As such, support data that is most valuable to diagnosis is collected and transmitted to the diagnostic device 106 first, thereby enabling diagnostic analysis to begin sooner.

In some cases, a cause of the fault of the storage appliance 110 may be diagnosed and resolved before the remaining support data is transmitted to the diagnostic device 106. This is because the prioritized support bundle 118 as a whole may include a few dozen modules of support data, not all of which are needed to resolve many faults of the storage appliance 110. Thus, referring to FIGS. 1 and 2, the prioritized support bundle 118 segregates low priority data 200 of the support data and other remaining data 202 in the support data into one or more separate bundle subsets.

Figure 2:
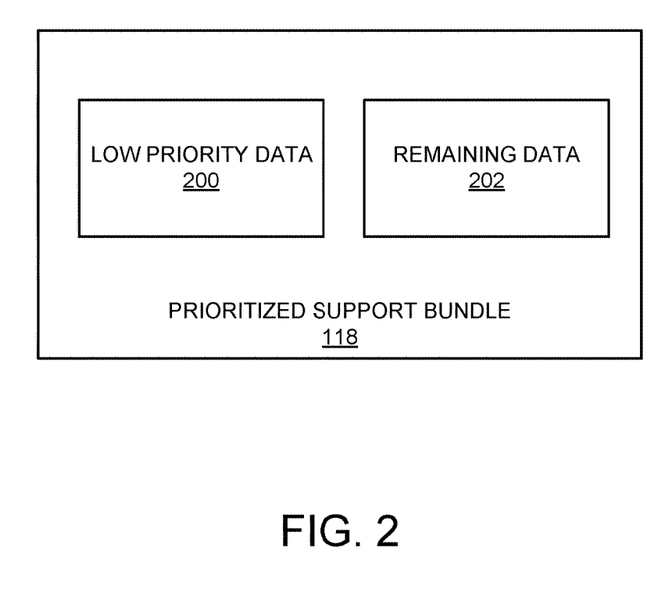
FIG. 2 is a block diagram of an example prioritized support bundle.

For example, file system metadata dump is generally only needed to diagnose and resolve a small percentage of faults of the storage appliance 110 but it comprises a large portion of the support data. Thus, in one implementation, the storage appliance 110 identifies the file system metadata dumps from the support data and generates the prioritized support bundle 118 with the file system metadata dumps identified as the low priority data 200 and included in the low priority bundle subset separate from the remaining support data 202. The storage appliance 110 sends the remaining support data 202 to the diagnostic device 106 in one or more bundle subsets with the low priority bundle subset containing the file system metadata dumps being sent separately. As such, latency in transmission and diagnosis is reduced, increasing client satisfaction.

In one implementation, the storage appliance 110 identifies a fault and automatically reports the fault through a telemetry path to the client device 116, the diagnostic device 106, and/or other devices deployed in the storage system 100. Faults may be alternatively or additionally reported through other hardware and/or software monitoring processors, such as an Integrated Lights Out Manager (ILOM). Notifications about faults and other service related issues for components of the storage system 100 may thus be provided as they occur. Once the fault indication is received, a request for support data is received at the storage appliance 110. The request may be automatically or manually generated and sent from various components of the storage system 100, including, but not limited to, the storage appliance 110, the client device 116, the diagnostic device 106, and the like. In one implementation, a service request is generated in response to the fault indication, and a service engineer instructs the client to send a command to the storage appliance 110 from the client device 116 or directly to collect and send the support data.

The request for support data may specify the type of support data needed to diagnose the fault. For example, the request may specify the kernel core files of the storage appliance 110, the log or trace files for the storage appliance 110, a device status for fiber channel ports of the storage network 102, and/or other types of support data based on the nature of the fault. In one implementation, the prioritized support bundle 118 is generated in response to the request containing the requested support data.

To reduce the time to collect and send the prioritized support bundle 118, the storage appliance 110 segregates the support data into one or more bundle subsets based on how the support data is accounted for and partitioned in the storage appliance 110 by the kernel. For example, the kernel of the storage appliance 110 accounts for a plurality of sections of content when dump files are created, including, kernel core image data, user process related data, and file system metadata.

The file system metadata is typically the largest and least often used in diagnostic analysis. For example, a fault involving the storage media 112 may be generally diagnosed and resolved using status information about the system configuration of the storage appliance 110; a fault where the system panics may typically be diagnosed and resolved using the panic code for the software; a fault involving a hardware failure on a controller of the storage network 102 may be diagnosed and resolved using the log files relating the the controller; and one of the less common instances where the file system metadata is needed to diagnose and resolve a fault involves data corruption in the file system.

Accordingly, in one implementation, the storage appliance 110 identifies the file system metadata as the low priority data 200 and segregates the low priority data 200 from all other data 202, including the kernel files, process files, log files, trace files, and/or the like. The storage appliance 110 sends the other data 202 to the diagnostic device 106 as one or more high priority bundle subsets, which may be further prioritized based on content, separate from the low priority bundle subset containing the low priority data 200. In one implementation, two files are created, a low priority bundle subset containing the file system metadata and a high priority bundle subset containing the remaining support data, and separately uploaded or otherwise sent over the network 108 to the diagnostic device 106.

In one implementation, each bundle subset of the prioritized support bundle 118 is created and uploaded independently to the diagnostic device 106. The transmission of the bundle subsets may run in parallel and complete at independent rates. The transmission of each bundle subset may be separately retried, cancelled, downloaded, and deleted using the client device 116 and/or the diagnostic device 106. In one implementation, the BUI and/or the CLI reports the upload paths of each of bundle subset of the prioritized support bundle 118 and tracks the progress of each upload to provide a status to the client. The BUI and/or the CLI may generate an alert after each bundle subset is finished with a result indicating whether the upload was OK or failed. In one implementation, the REST API creates command returns handles to each of the bundle subsets.

In one implementation, the low priority data 200 is identified and segregated into the low priority bundle subset, and the remaining data 202 is collected into a high priority bundle subset and transmitted to the diagnostic device 106 first. Stated differently, rather than identifying support data that is needed for diagnostic analysis, the storage applicant 110 identifies support data that is less likely to be needed for diagnostic analysis. The high priority bundle subset is generally significantly smaller than the low priority bundle subset, so transmission time of the high priority bundle subset is minimal (e.g., on a scale of hours) compared to the transmission time of the low priority bundle subset (e.g., on a scale of days). Thus, the diagnostic analysis may begin once the high priority bundle subset is received at the diagnostic device 106 and in some cases may be resolved before the low priority bundle subset is received at the diagnostic device 106. In such cases, the upload of the low priority bundle subset may be cancelled or otherwise ignored. The collection and upload of the prioritized support bundle 118 in a plurality of prioritized files thus reduces the time before diagnosis and resolution, thereby increasing client satisfaction.

Figure 3:
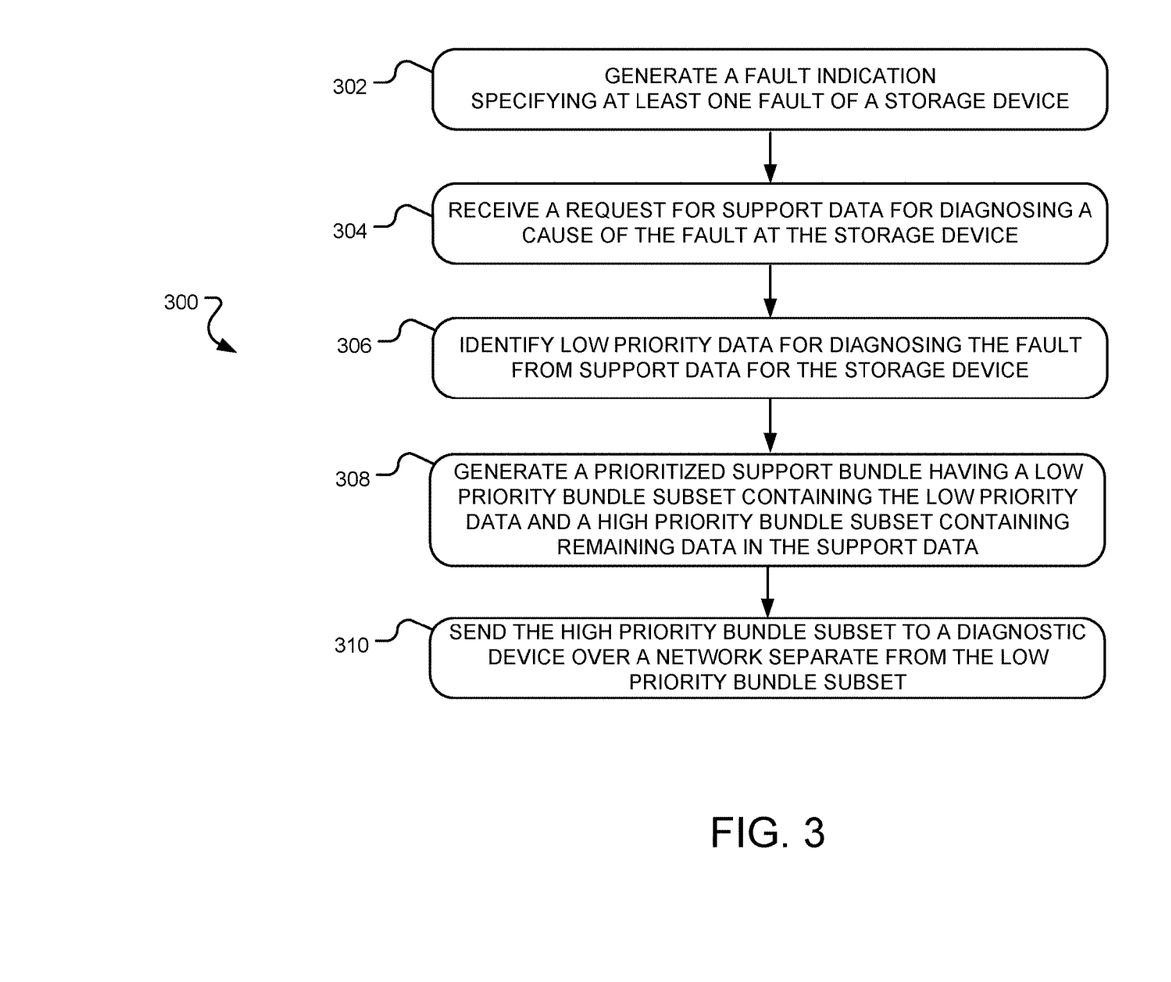
FIG. 3 illustrates example operations for sending diagnostic data over a network.

Turning to FIG. 3, example operations 300 for sending diagnostic data over a network are illustrated. In one implementation, an operation 302 generates a fault indication specifying at least one fault of a storage device, which may be a storage appliance. An operation 304 receives a request at the storage device for support data for diagnosing a cause of the fault. In one implementation, the operation 304 receives the command from a client device.

An operation 306 identifies low priority data for diagnosing the cause of the fault from the support data for the storage device, and an operation 308 generates a prioritized support bundle having a low priority bundle subset containing the low priority data and a high priority bundle subset containing remaining data in the support data. The low priority data may include file system metadata, and the remaining data may include at least one of kernel core files or processing files. An operation 310 sends the high priority bundle subset to a diagnostic device over a network separate from the low priority bundle subset. In one implementation, the low priority bundle subset is sent separately from and in parallel to the high priority bundle subset over the network. In another implementation, the high priority bundle subset is sent prior to the low priority bundle subset over the network. The operation 310 may generate a status of progress of sending each bundle subset and/or report an upload path of each bundle subset.

Figure 4:
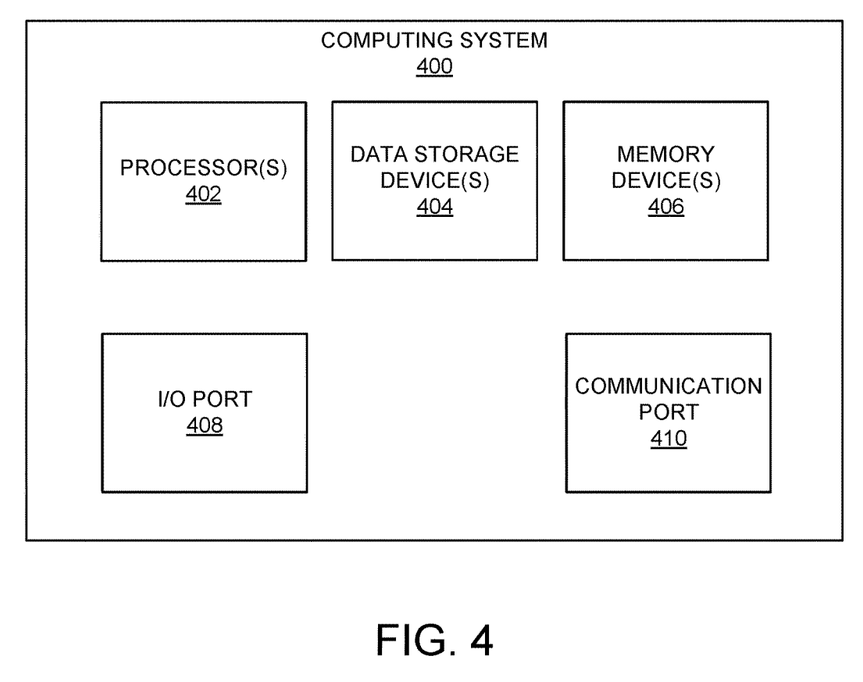
FIG. 4 is an example computing system that may implement various systems and methods of the presently disclosed technology.

Referring to FIG. 4, a detailed description of an example computing system 400 having one or more computing units that may implement various systems and methods discussed herein is provided. The computing system 400 may be applicable to the diagnostic device 106, the storage appliance 110, the server 114, the client device 116, and other computing or network devices. It will be appreciated that specific implementations of these devices may be of differing possible specific computing architectures not all of which are specifically discussed herein but will be understood by those of ordinary skill in the art.

The computing system 400 may be a computing system is capable of executing a computer program product to execute a computer process. Data and program files may be input to the computing system 400, which reads the files and executes the programs therein. Some of the elements of the computing system 400 are shown in FIG. 4, including one or more hardware processors 402, one or more data storage devices 404, one or more memory devices 408, and/or one or more ports 408-410. Additionally, other elements that will be recognized by those skilled in the art may be included in the computing system 400 but are not explicitly depicted in FIG. 4 or discussed further herein. Various elements of the computing system 400 may communicate with one another by way of one or more communication buses, point-to-point communication paths, or other communication means not explicitly depicted in FIG. 4.

The processor 402 may include, for example, a central processing unit (CPU), a microprocessor, a microcontroller, a digital signal processor (DSP), and/or one or more internal levels of cache. There may be one or more processors 402, such that the processor 402 comprises a single central-processing unit, or a plurality of processing units capable of executing instructions and performing operations in parallel with each other, commonly referred to as a parallel processing environment.

The computing system 400 may be a conventional computer, a distributed computer, or any other type of computer, such as one or more external computers made available via a cloud computing architecture. The presently described technology is optionally implemented in software stored on the data stored device(s) 404, stored on the memory device (s) 406, and/or communicated via one or more of the ports 408-410, thereby transforming the computing system 400 in FIG. 4 to a special purpose machine for implementing the operations described herein. Examples of the computing system 400 include personal computers, terminals, workstations, mobile phones, tablets, laptops, personal computers, multimedia consoles, gaming consoles, set top boxes, and the like.

The one or more data storage devices 404 may include any non-volatile data storage device capable of storing data generated or employed within the computing system 400, such as computer executable instructions for performing a computer process, which may include instructions of both application programs and an operating system (OS) that manages the various components of the computing system 400. The data storage devices 404 may include, without limitation, magnetic disk drives, optical disk drives, solid state drives (SSDs), flash drives, and the like. The data storage devices 404 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 406 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 404 and/or the memory devices 406, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computing system 400 includes one or more ports, such as an input/output (I/O) port 408 and a communication port 410, for communicating with other computing, network, or vehicle devices. It will be appreciated that the ports 408-410 may be combined or separate and that more or fewer ports may be included in the computing system 400.

The I/O port 408 may be connected to an I/O device, or other device, by which information is input to or output from the computing system 400. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing system 400 via the I/O port 408. Similarly, the output devices may convert electrical signals received from computing system 400 via the I/O port 408 into signals that may be sensed as output by a human, such as sound, light, and/or touch. The input device may be an alphanumeric input device, including alphanumeric and other keys for communicating information and/or command selections to the processor 402 via the I/O port 408. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

The environment transducer devices convert one form of energy or signal into another for input into or output from the computing system 400 via the I/O port 408. For example, an electrical signal generated within the computing system 400 may be converted to another type of signal, and/or vice-versa. In one implementation, the environment transducer devices sense characteristics or aspects of an environment local to or remote from the computing system 400, such as, light, sound, temperature, pressure, magnetic field, electric field, chemical properties, physical movement, orientation, acceleration, gravity, and/or the like. Further, the environment transducer devices may generate signals to impose some effect on the environment either local to or remote from the example computing system 400, such as, physical movement of some object (e.g., a mechanical actuator), heating or cooling of a substance, adding a chemical substance, and/or the like.

In one implementation, a communication port 410 is connected to a network by way of which the computing system 400 may receive network data useful in executing the methods and systems set out herein as well as transmitting information and network configuration changes determined thereby. Stated differently, the communication port 410 connects the computing system 400 to one or more communication interface devices configured to transmit and/or receive information between the computing system 400 and other devices by way of one or more wired or wireless communication networks or connections. One or more such communication interface devices may be utilized via the communication port 410 to communicate one or more other machines, either directly over a point-to-point communication path, over a wide area network (WAN) (e.g., the Internet), over a local area network (LAN), over a cellular network, or over another communication means. Further, the communication port 410 may communicate with an antenna or other link for electromagnetic signal transmission and/or reception.

In an example implementation, the prioritized support bundle 118 and support and diagnostic analysis software and other modules and services may be embodied by instructions stored on the data storage devices 404 and/or the memory devices 406 and executed by the processor 402.

The system set forth in FIG. 4 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM); erasable programmable memory (e.g., EPROM and EEPROM); flash memory; or other types of medium suitable for storing electronic instructions.

While the present disclosure has been described with reference to various implementations, it will be understood that these implementations are illustrative and that the scope of the present disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for fault diagnostic analysis in a storage network, the method comprising:
   generating a fault indication specifying at least one fault of a storage device, wherein the storage device is in communication with a diagnostic device over a network;
   receiving a request at the storage device for support data for diagnosing a cause of the at least one fault, wherein the support data is stored on the storage device and comprises a first portion of data and a second portion of data;
   identifying the first portion of data as data assigned a first priority for diagnosing the cause of the fault;
   generating a prioritized support bundle having a first priority bundle subset and a second priority bundle subset, the first priority bundle subset containing the first portion of data, the first portion of data including file system metadata of the storage device, and the second priority bundle subset containing the second portion of data, the second portion of data including one or more kernel files of the storage device, the second portion of data having a higher priority than the first portion of data, wherein the second priority bundle subset is smaller than the first priority bundle subset;
   sending the second priority bundle subset and the first priority bundles subset separately to the diagnostic device over the network; and
   generating a status indicative of a progress of sending each of the second priority bundle subset and the first priority bundle subset to the diagnostic device.

2. The method of claim 1, wherein the second priority bundle subset is sent to the diagnostic device over the network prior to the first priority bundle subset.

3. The method of claim 1, wherein the first priority bundle subset is sent to the diagnostic device separate from and in parallel to the second priority bundle subset over the network.

4. The method of claim 1, wherein the request for the support data is received at the storage device from a client device over the network.

5. The method of claim 1, wherein the second portion of data includes processing files.

6. The method of claim 1, further comprising:
generating a report of an network path for sending each of the second priority bundle subset and the first priority bundle subset to the diagnostic device.

7. One or more tangible non-transitory computer-readable storage media storing computer executable instructions for performing a computer process on a computing system, the computer process comprising:
generating a fault indication specifying at least one fault of a storage device, wherein the storage device is in communication with a diagnostic device over a network;
receiving a request at the storage device for support data for diagnosing a cause of the at least one fault, wherein the support data is stored on the storage device and comprises a first portion of data and a second portion of data;
identifying the first portion of data as low priority data for diagnosing the cause of the fault;
generating a prioritized support bundle having a low priority bundle subset and a high priority bundle subset, the low priority bundle subset containing the first portion of data, the first portion of data including file system metadata of the storage device, and the high priority bundle subset containing the second portion of data, the second portion of data including one or more kernel files of the storage device, wherein the high priority bundle subset is smaller than the low priority bundle subset;
sending the high priority bundle subset to the diagnostic device over the network separate from the low priority bundle subset; and
generating a status indicative of a progress of sending each of the high priority bundle subset and the low priority bundle subset to the diagnostic device.

8. The one or more tangible non-transitory computer-readable storage media of claim 7, wherein the high priority bundle subset is sent to the diagnostic device over the network prior to the low priority bundle subset.

9. The one or more tangible non-transitory computer-readable storage media of claim 7, wherein the low priority bundle subset is sent to the diagnostic device separate from and in parallel to the high priority bundle subset over the network.

10. The one or more tangible non-transitory computer-readable storage media of claim 7, wherein the request for the support data is received at the storage device from a client device over the network.

11. The one or more tangible non-transitory computer-readable storage media of claim 7, wherein the second portion of data includes processing files.

12. A system for fault diagnostic analysis in a storage network, the system comprising:
a diagnostic device for analyzing a cause of storage device faults; and
a storage device in communication with the diagnostic device over a network, the storage device generating a prioritized support bundle that includes a low priority bundle subset and a high priority bundle subset, the low priority bundle subset containing a first portion of data identified as low priority data from support data stored on the storage device, the first portion of data including file system metadata of the storage device, and the high priority bundle subset containing a second portion of data that includes one or more kernel files of the storage device, the high priority bundle subset being smaller than the low priority bundle subset, the storage device sending the high priority bundle subset to the diagnostic device over the network separate from the low priority bundle subset, and the storage device generates a status indicative of a progress of sending each of the high priority bundle subset and the low priority bundle subset to the diagnostic device.

13. The system of claim 12, wherein the high priority bundle subset is sent to the diagnostic device over the network prior to the low priority bundle subset.

14. The system of claim 12, wherein the low priority bundle subset is sent to the diagnostic device separate from and in parallel to the high priority bundle subset over the network.

15. The system of claim 12, wherein a request for the support data is received at the storage device from a client device over the network.

16. The system of claim 12, wherein the high priority bundle subset includes processing files.

* * * * *

UNITED STATES PATENT AND TRADEMARK OFFICE
CERTIFICATE OF CORRECTION

PATENT NO.        : 10,275,300 B2
APPLICATION NO.   : 14/924211
DATED             : April 30, 2019
INVENTOR(S)       : Vetter et al.

Page 1 of 1

It is certified that error appears in the above-identified patent and that said Letters Patent is hereby corrected as shown below:

In the Specification

In Column 2, Line 40, delete "for for" and insert -- for --, therefor.

In Column 4, Line 57, delete "the the" and insert -- the --, therefor.

In Column 6, Line 1, delete "the the" and insert -- the --, therefor.

Signed and Sealed this
Twenty-first Day of July, 2020

Andrei Iancu
*Director of the United States Patent and Trademark Office*